United States Patent [19]

Fujibayashi et al.

[11] Patent Number: 4,991,942
[45] Date of Patent: Feb. 12, 1991

[54] ZOOM LENS

[75] Inventors: Kazuo Fujibayashi, Kanagawa; Makoto Sekita, Tokyo, both of Japan

[73] Assignee: Canon Kabushiki Kaisha, Tokyo, Japan

[21] Appl. No.: 514,726

[22] Filed: Apr. 26, 1990

[30] Foreign Application Priority Data

May 2, 1989 [JP] Japan .................................. 1-112975
Sep. 1, 1989 [JP] Japan .................................. 1-226634

[51] Int. Cl.⁵ .......................... G02B 15/15; G02B 9/64
[52] U.S. Cl. ...................................... 350/423; 350/450
[58] Field of Search ......................... 350/423, 427, 450

[56] References Cited

U.S. PATENT DOCUMENTS 4,815,829  3/1989  Yamanashi et al. ................. 350/423

Primary Examiner—Bruce Y. Arnold
Assistant Examiner—Rebecca D. Gass
Attorney, Agent, or Firm—Fitzpatrick, Cella, Harper & Scinto

[57] ABSTRACT

A zoom lens comprising, from front to rear, a first lens group of positive power, a second lens group of negative power, and a third lens group of positive power, wherein the second and third lens groups are axially moved in differential relation to effect zooming, and the following conditions are satisfied:

| 0.9 | < | $|\beta 2T|$ | < | 1.1, | $\beta 2T$ | < | 0 |
| 0.5 | < | $|\beta 3T|$ | < | 1 | $\beta 3T$ | < | 0 |
| 0.4 | < | $XIII/fw$ | < | 0.6 | | | | where $\beta 2T$ and $\beta 2T$ are the image magnifications at the telephoto end of the second and third lens groups respectively, XIII is the range of zooming movement of the third lens group, and fW is the shortest focal length of the entire lens system.

7 Claims, 14 Drawing Sheets

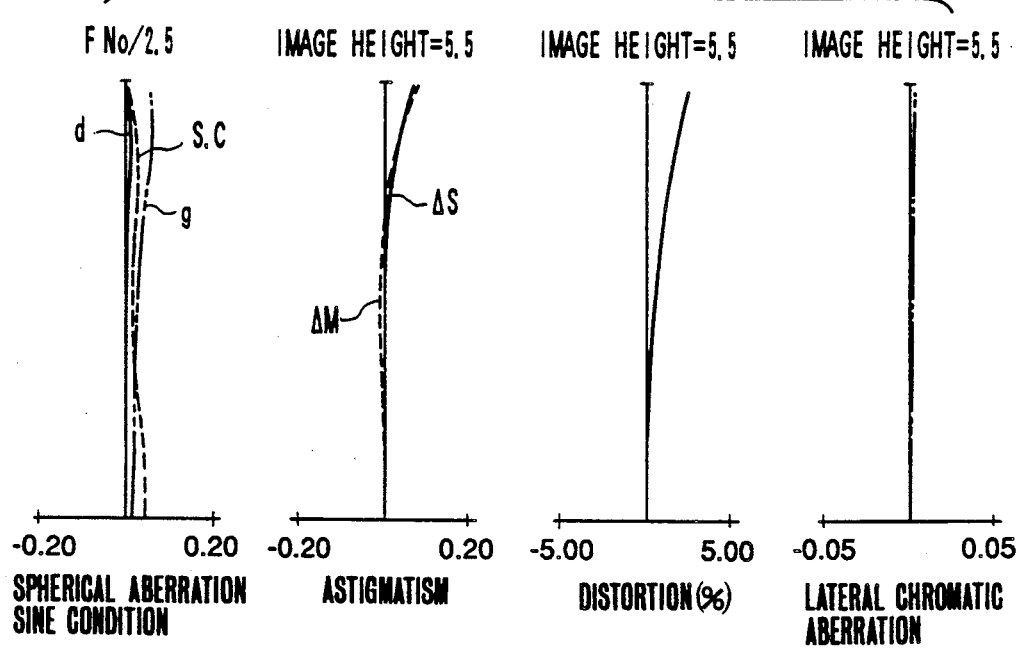
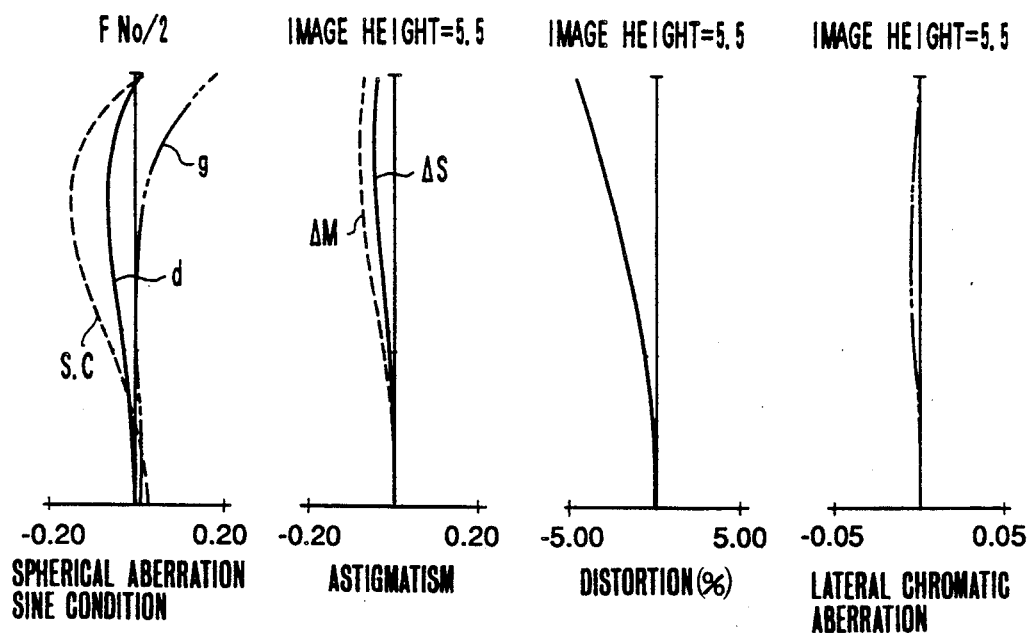

ZOOM LENS

BACKGROUND OF THE INVENTION

1. Field of the Invention.

This invention relates to zoom lenses and, more particularly, 3-component zoom lenses of extended range to about 3, while still maintaining minimization of the size and weight of the entire lens system to be achieved, suited to photographic cameras or video cameras.

2. Description of the Related Art

Of the zoom lenses of relatively high ratio of focal length variation which have found their use in photographic cameras, video cameras, etc., there is a type in which the total number of lens groups is four, or the so-called 4-component zoom lens. This zoom lens comprises, from front to rear, a first lens group of positive power for focusing, a second lens group of negative power monotonously movable for mainly varying the image magnification, a third lens group of negative or positive power non-linearly movable for compensating for the shift of an image plane resulting from the variation of the image magnification, and a fourth lens group of positive power having an image forming function.

The 4-component zoom lens of this character, while being corrected for the variation of aberrations with zooming by the first to third lens groups, has its fourth lens group made to correct the zooming-independent aberrations, or so-called bias component aberrations.

For this reason, the structure of the constituent members of the fourth lens group tends to get relatively complicated. This leads to a problem that the physical length of the lens becomes long.

Another problem arises from the arrangement of the stop in between the third lens group and the fourth lens group. Because of the long distance from the first lens group to the stop, to admit of the off-axial light beam, the diameter of the first lens group has to increase.

Meanwhile, Japanese Patent Publication No. Sho 58-32684 discloses a zoom lens of relatively small size comprising, from front to rear, a first lens group of positive power, a second lens group of negative power and a third lens group of positive power, these three lens groups being moved to effect variation of the focal length.

The zoom lens proposed in the same document has its range of image magnification limited to 2.5 or thereabout. Also, because the zooming movement of the first lens group is made to be directed to the object side, the diameter of the first lens group and the total length of the entire lens system tend to increase in any way.

SUMMARY OF THE INVENTION

The present invention is to solve the problem that arises from the use of three lens groups in forming the entire lens system and the increase of the zoom ratio to as high a value as 3, which leads to an increase in the diameter of the first lens group and the total length of the entire lens system. It is, therefore, a first object to provide a zoom lens in which a minimization of the bulk and size of the entire lens system is achieved in such a way that the variation of aberrations with zooming is well corrected for high optical performance throughout the extended zooming range.

A second object is to provide a zoom lens in which the movements of the movable lenses are made monotonous to achieve simplification of the lens barrel mechanism so that it is suited to the photographic camera, video camera, etc.

BRIEF DESCRIPTION OF THE DRAWINGS

FIGS. 5(A), 5(B) and 5(C), FIGS. 6(A), 6(B) and 6(C), FIGS. 7(A), 7(B) and 7(C), FIGS. 8(A), 8(B) and 8(C), FIGS. 12(A), 12(B) and 12(C), FIGS. 13(A), 13(B) and 13(C) and FIGS. 14(A), 14(B) and 14(C) are graphic representations of the various aberrations of the examples 1 to 7 of the zoom lenses of the invention respectively.

Figure 1:
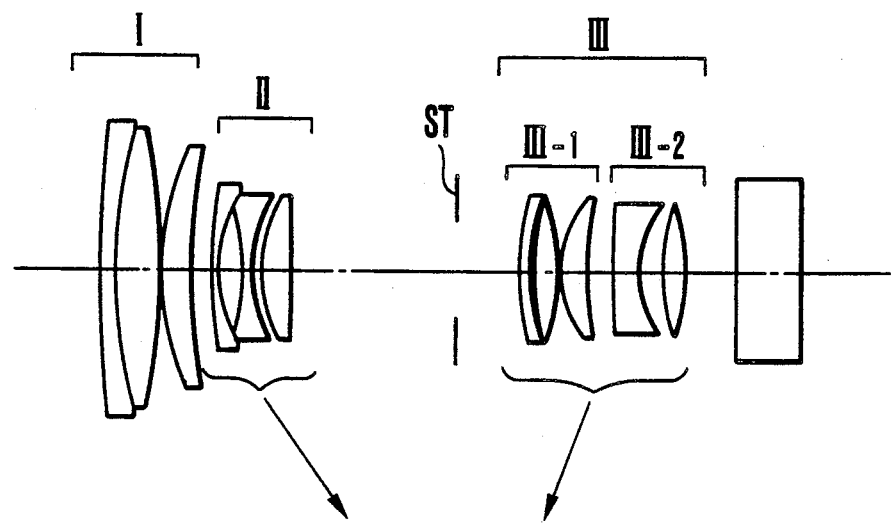
FIGS. 1, 2, 3, 4, 9, 10 and 11 are longitudinal section views of examples 1 to 7 of specific zoom lenses of the invention respectively.
Figure 2:
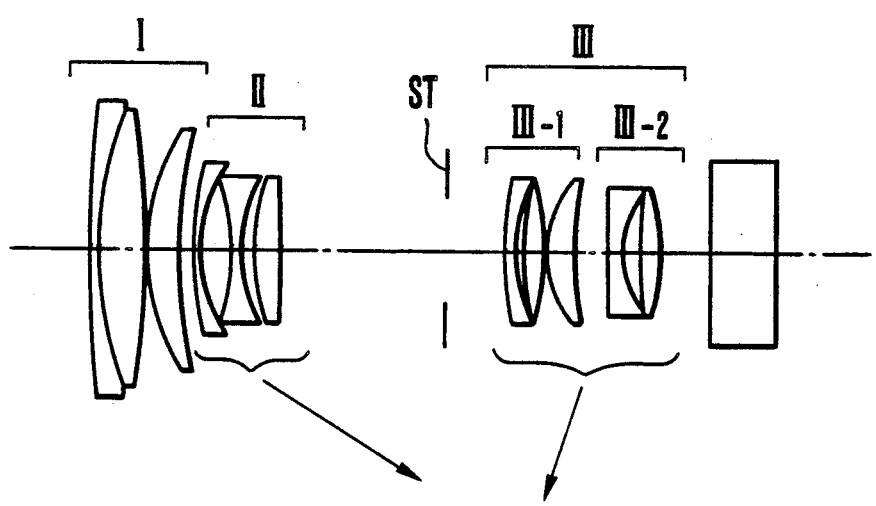
Figure 3:
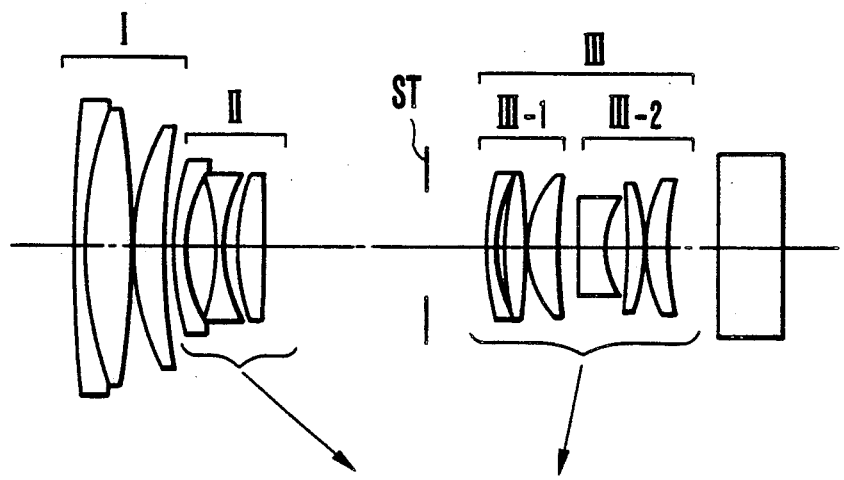
Figure 4:
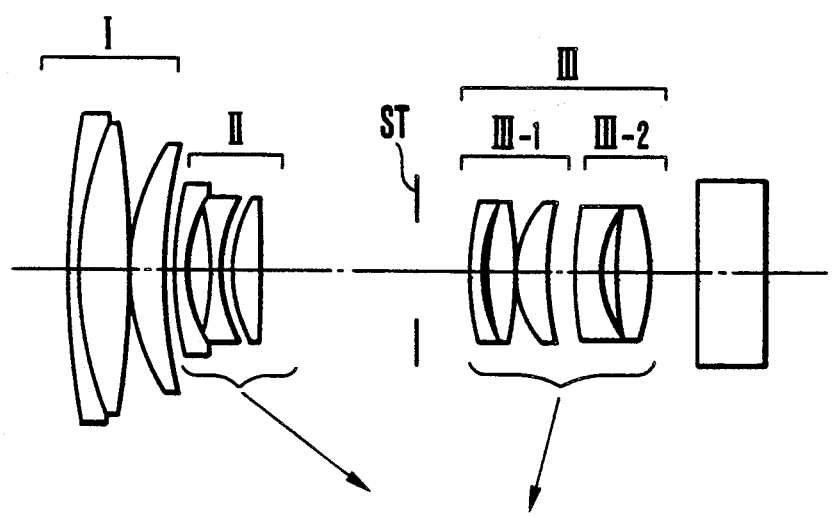
Figure 5A:
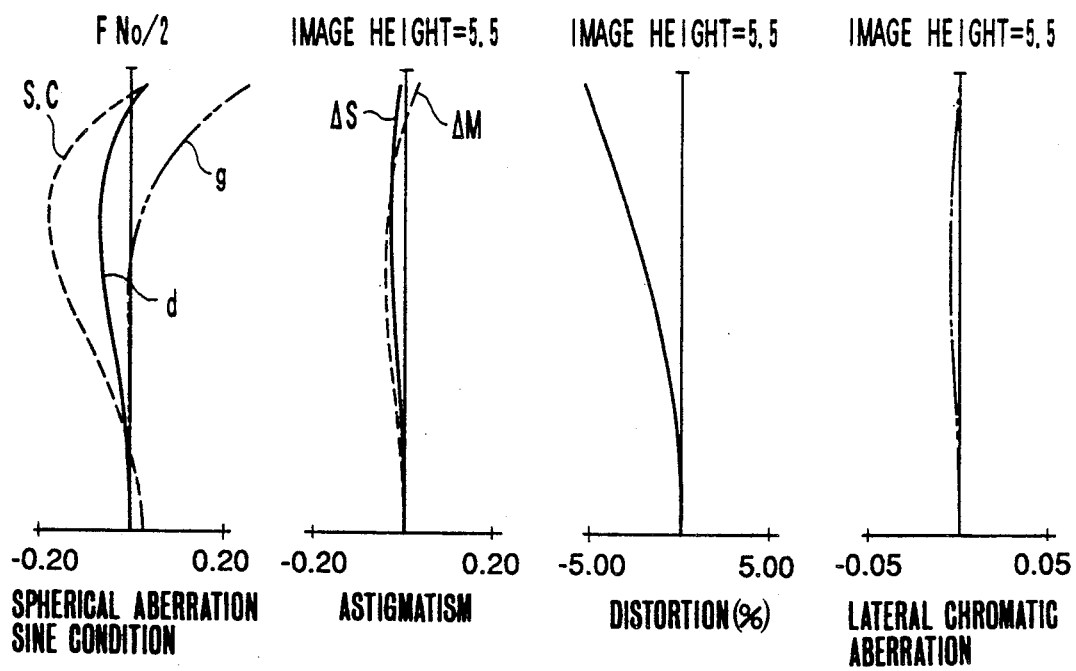
Figure 5B:
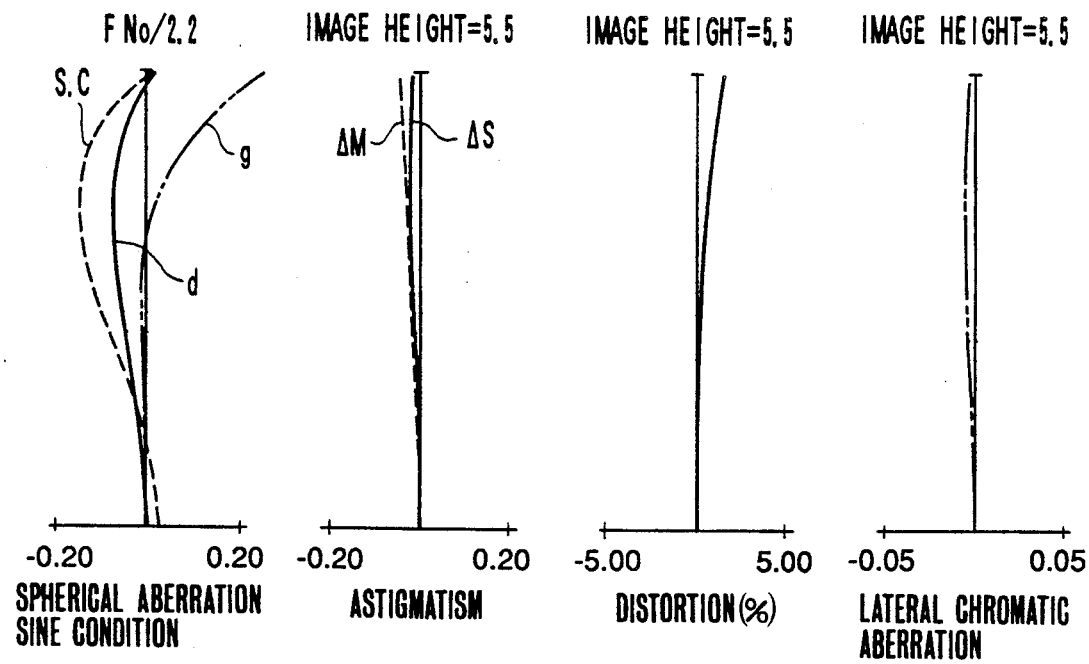
Figure 5C:
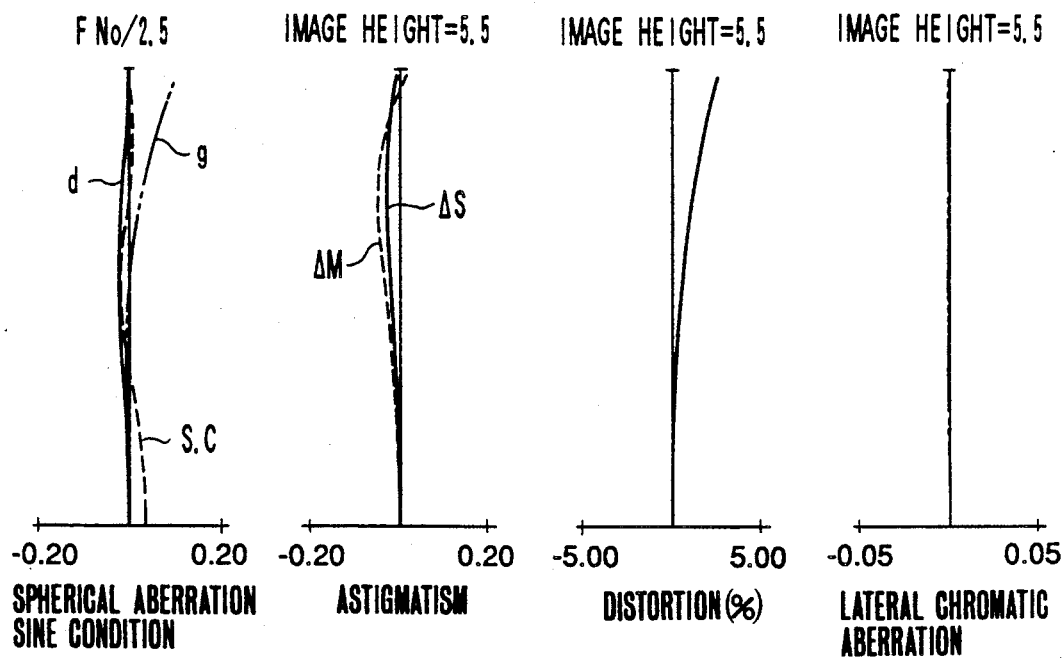
Figure 6A:
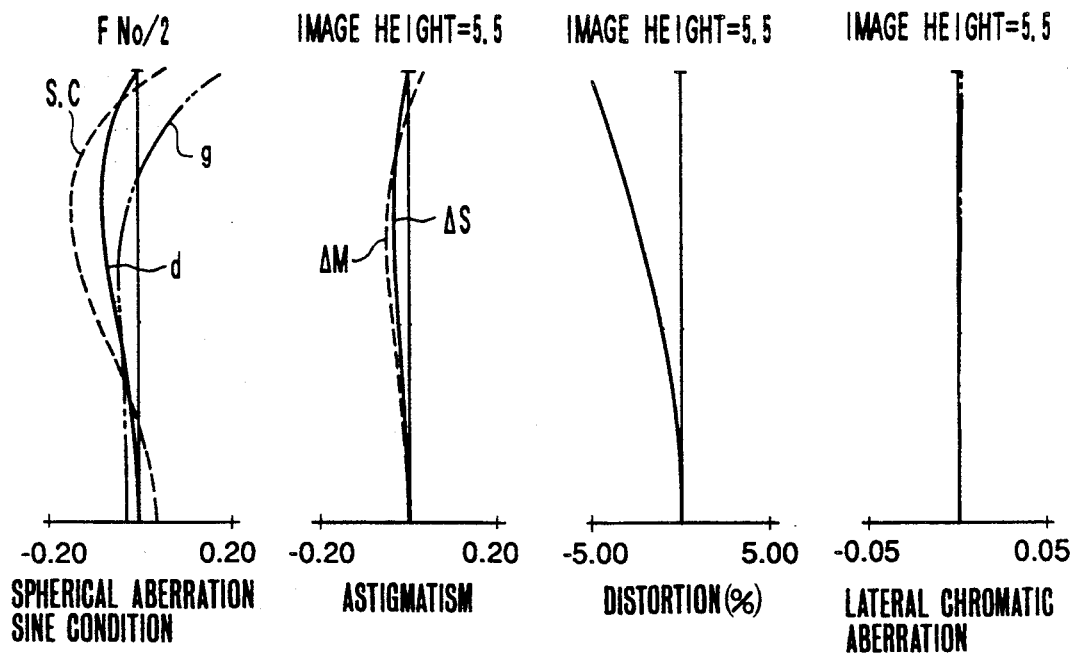
Figure 6B:
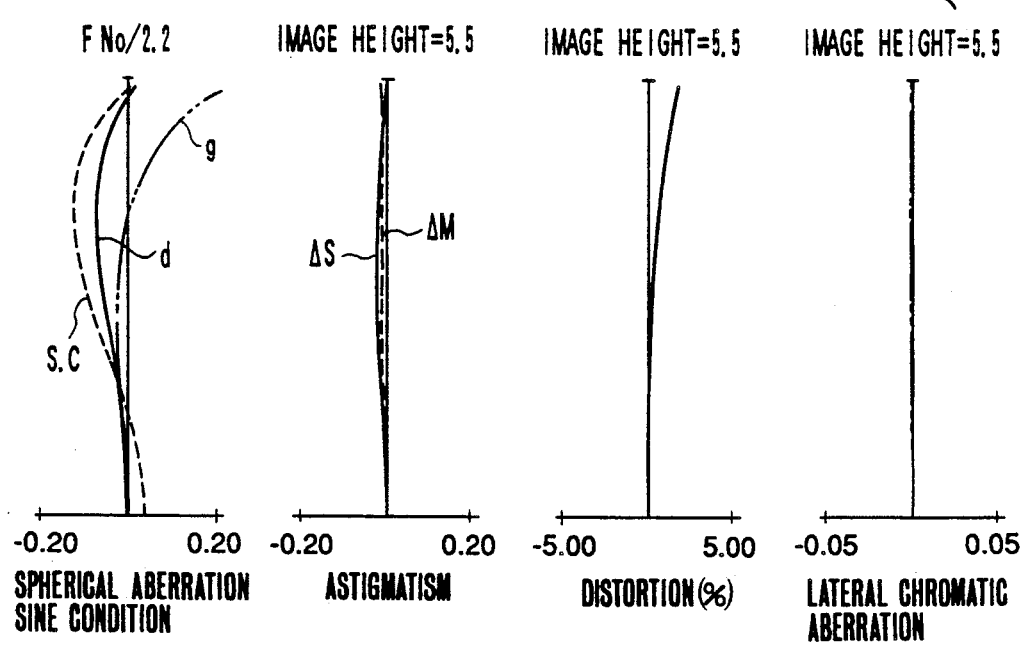
Figure 6C:
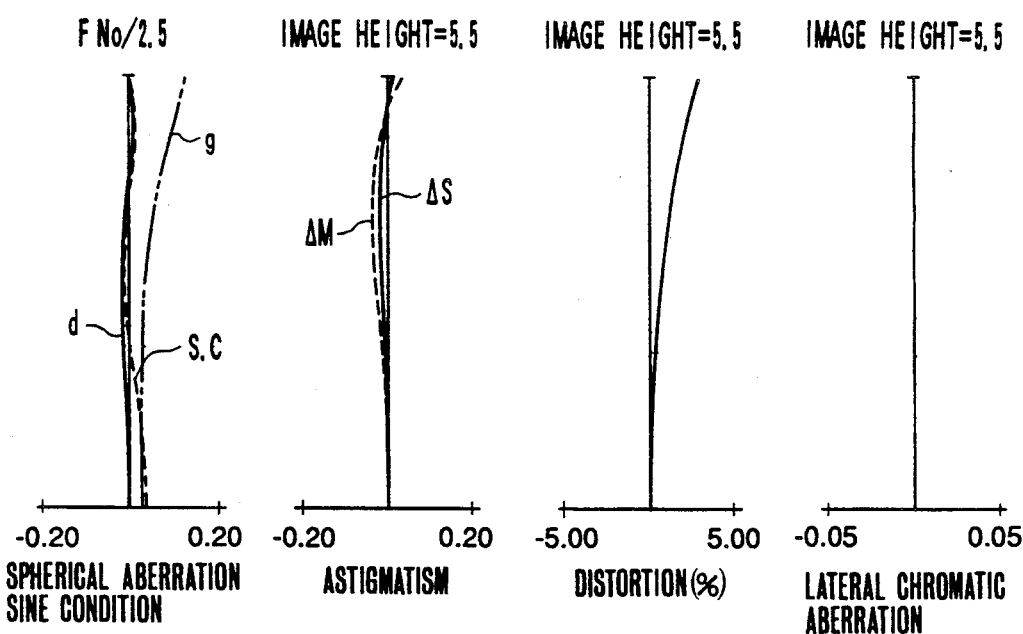
Figure 7A:
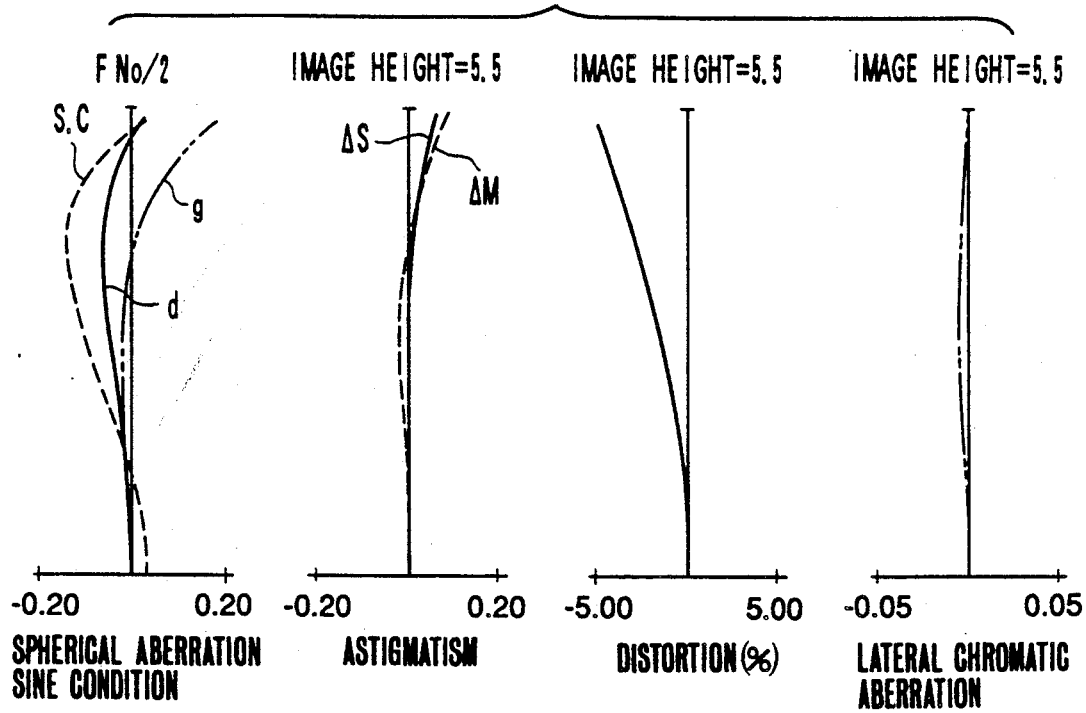
Figure 7B:
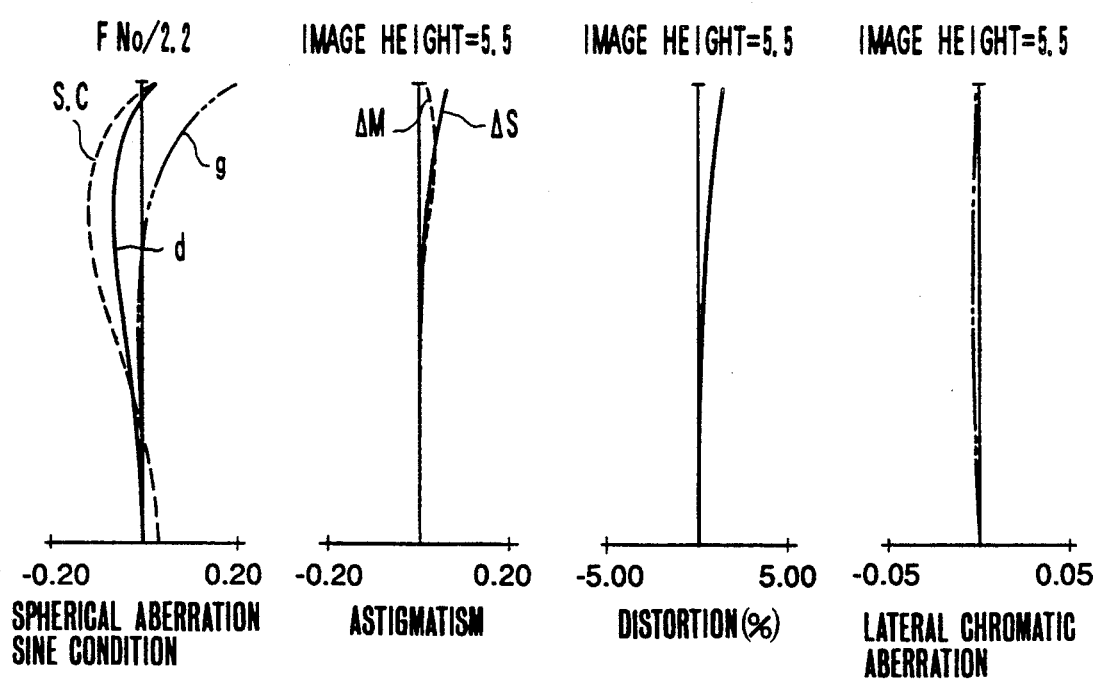
Figure 8B:
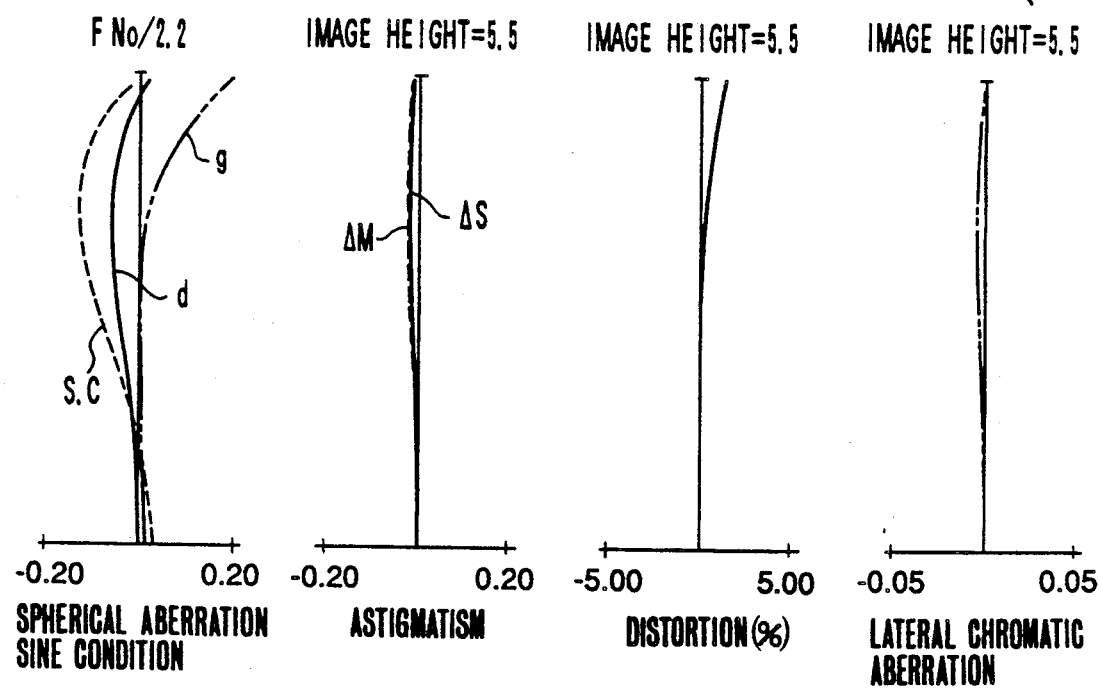
Figure 8C:
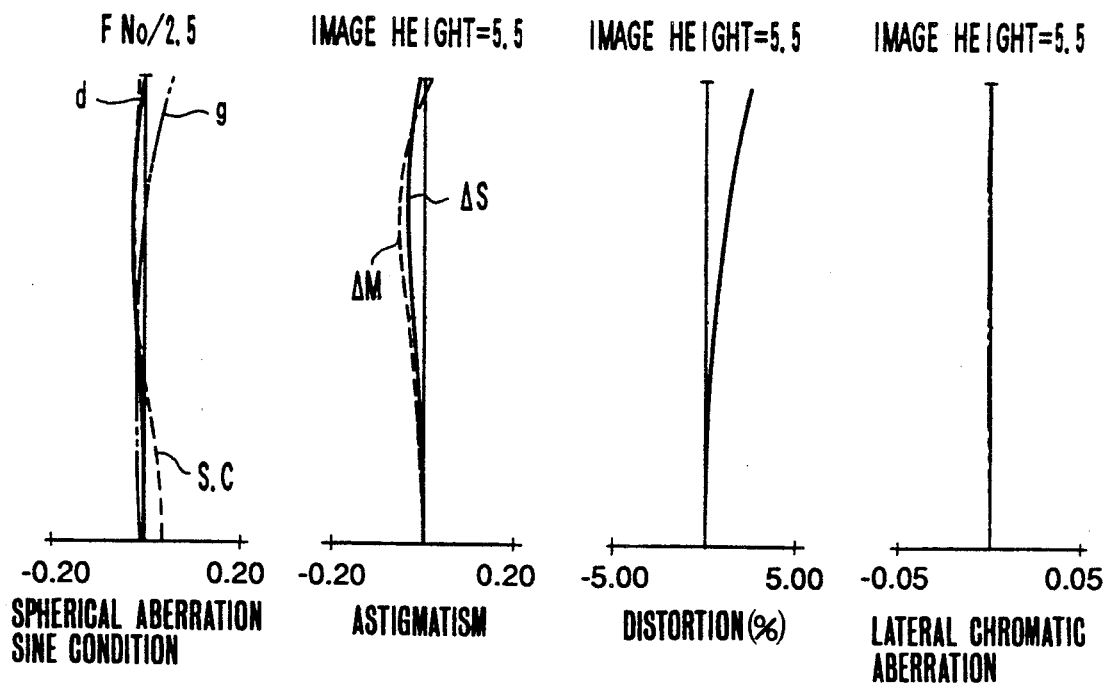

In these graphs, a suffix (A) attached to the figure number shows the wide-angle end, another suffix (B) shows the intermediate position, and another suffix (C) shows the telephoto end.

In the figures, I stands for the first lens group, II for the second lens group, III for the third lens group, III-1 for the front lens sub-group of the third lens group, III-2 for the rear lens sub-group of the third lens group, ST for the stop, d for the spectral d-line, g for the spectral g-line, S.C. for the sine condition, $\Delta S$ for the sagittal image surface, $\Delta M$ for the meridional image surface, and y for the image height.

DETAILED DESCRIPTION OF THE PREFERRED EMBODIMENTS

FIG. 1 to FIG. 4 show respectively longitudinal section views of specific examples of an embodiment of a zoom lens according to the invention, wherein the zoom lens comprises, from front to rear, a first lens group I of positive power for focusing, a second lens group II of negative power and a third lens group III of positive refractive power. The second and third lens groups II and III constitute a focal length varying system. An axially fixed stop ST is positioned in a space between the second and third lens groups. When zooming from the wide-angle end to the telephoto end, the second and third lens groups II and III axially move to directions indicated by respective arrows, that is, to the image side and to the object side respectively.

And, the invention sets forth rules of design for the image magnifications $\beta 2T$ and $\beta 3T$ of the second lens group II and the third lens group III at the telephoto end respectively, and the total zooming movement XIII of the third lens group III in terms of the shortest focal length fW of the entire lens system as follows:

$$09 < |\beta 2T| < 1.1, \beta 2T < 0 \quad (1)$$

$$05 < |\beta 3T| < 1, \beta 3T < 0 \quad (2)$$

$$0.4 < XIII/fW < 0.6 \quad (3)$$

The technical significance of each of the above-described conditions is explained below.

The inequalities of conditions (1) and (2) give proper ranges for the image magnifications of the second and third lens groups at the telephoto end respectively.

Of these, the condition (1) has aims that with the maintenance of the prescribed refractive power of the second lens group, its total zooming movement becomes as short as possible, thus getting an advantage of increasing the zoom ratio to a desired value, and that its direction of movement for zooming is reverse to that of movement of the third lens group.

When the lower limit is exceeded, weakening of the refractive power of the second lens group results, and the required total zooming movement for the second lens group increases largely. When the upper limit is exceeded, it becomes difficult to allow the third lens group to move linearly over the zooming range. Further, the total zooming movement of the third lens group is caused to increase too much to avoid occurrence of mechanical interference of the third lens group with the stop.

The condition (2) has an aim that the axial separation between the second lens group and the third lens group at the telephoto end is so appropriate, and the contribution of the third lens group to the focal length varying function is so adequate, that the desired zoom ratio is obtained with ease.

When the lower limit is exceeded, the axial separation between the second lens group and the third lens group becomes too narrow to assure that the stop is arranged to be stationary during zooming. When the upper limit is exceeded, the focal length varying effect of the third lens group weakens to increase the shares of the second lens group for the magnification variation and aberration correction objectionably.

The condition (3) gives a proper range for the total zooming movement of the third lens group and, in cooperation with the conditions (1) and (2), has a main aim that, while keeping the zoom ratio at the prescribed value, the variation of aberrations with zooming is well corrected.

When the upper limit is exceeded, the range of variation of aberrations with zooming increases. When the lower limit is exceeded, the focal length varying function of the third lens group weakens, and this is reflected to increase the shares of the second lens group for the focal length variation and aberration correction. Therefore, the difficulty of correcting various aberrations in good balance increases objectionably.

In particular, it should be pointed out that a simplification of the structure of construction of the operating mechanism for the zoom lens and a minimization of the bulk and size of the entire lens system are achieved by making arrangement of the stop ST in the space between the second lens group and the third lens group and making the stop ST axially stationary during zooming, and with this, an increase of the zoom ratio to the desired value under the condition that the third lens group does not mechanically interfere with the stop ST, is achieved by controlling the total zooming movement XIII and the image magnification $\beta 3T$ at the telephoto end of the third lens group as set forth by the inequalities of conditions (2) and (3).

The objects of the invention are accomplished by satisfying the above-described conditions. Yet, to further improve the correction of the variation of aberrations with zooming, the following various conditions may be satisfied:

The aforesaid third lens group has two lens subgroups, i.e., a front lens sub-group and a rear lens sub-group, with the widest air separation in the third lens group taking its place between them. The front lens sub-group comprises, from front to rear, a negative first lens of meniscus form concave toward the image side, a positive second lens of bi-convex form, and a positive third lens of meniscus form convex toward the object side, and the rear lens sub-group comprises, from front to rear, a negative lens of concave curvature toward the image side, and at least one positive lens. Letting the focal length of the air lens formed by the negative first lens and the positive second lens be denoted by f3a, the axial air separation between the front lens sub-group and the rear lens sub-group by D3a, and the refractive index of the material of the positive second lens N312, the following conditions are satisfied.

$$0.05 < |fW/f3a| < 0.35, \ f3a-0 \quad (4)$$

$$0.15 < |D3a/fW| < 0.4 \quad (5)$$

$$1.6 < N312 \quad (6)$$

As the third lens group is thus constructed from the front lens sub-group III-1 and the rear lens sub-group III-2, the numbers of constituent lenses of which are predetermined, the front lens sub-group is arranged mainly to correct the on-axial aberrations, and the rear lens sub-group mainly to correct the off-axial aberrations, thereby enabling all the aberrations to be corrected in good balance.

Particularly, the spherical aberration and the longitudinal chromatic aberration are corrected well when the front lens sub-group is constructed from the three lenses of the prescribed forms as has been described above.

Other aberrations, mainly the coma and the curvature of field, and the lateral chromatic aberration are corrected in good balance when the rear lens sub-group is constructed from at least two lenses including a negative lens and at least one positive lens.

The inequalities of condition (4) give a proper range for the refractive power of the air lens formed by the negative lens and the bi-convex positive lens in the front lens sub-group in order to correct the on-axial aberrations and the off-axial aberrations in good balance.

When the upper limit is exceeded, the coma and the field curvature produced increase. When the lower limit is exceeded, it becomes difficult to well correct the spherical aberration.

The inequalities of condition (5) have an aim to keep the axial air separation between the front lens sub-group and the rear lens sub-group so appropriate that in cooperation with the inequalities of condition (4), the on-axial aberrations and the off-axial aberrations are corrected in good balance.

When the upper limit is exceeded, large coma is produced from the rear lens sub-group. When the lower limit is exceeded, the spherical aberration and the curvature of field become difficult to correct in good balance.

The inequality of condition (6) concerns with the refractive index of the material of the bi-convex positive lens of the front lens sub-group and has a main aim to reduce the amount of produced spherical aberration. The violation of the condition mainly causes a large zonal spherical aberration, which is difficult to correct well, so that the resolving power comes to lower objectionably.

A furthermore feature of the present embodiment is that the range of variation of distortion and coma with zooming is minimized, and, at the same time, the imagery over the entire area of the picture frame is maintained well. On this account, every one of the lens groups must be so made up as to produce as small an amount of produced aberrations as possible. To this purpose, it is preferred to construct the second lens group from three lenses, or, from front to rear, a negative first lens of meniscus form convex toward the object side, a negative second lens of bi-concave form, and a positive third lens of convex curvature toward the object side. And, it is recommended to set forth a condition for the focal length f2a of the air lens formed by the negative second lens and the positive third lens of the second lens group as follows:

$$0 < f2a/fW < 0.1, (f2a < 0) \quad (7)$$

The inequalities of condition (7) have a main aim to correct the coma well. When the upper limit is exceeded, the first lens group has to be made to move forward for zooming purposes. Otherwise, the prescribed value of the separation between the second and third lens groups could not be secured. For this reason, the diameter of the first lens group increases largely, and the distortion increases objectionably. When the lower limit is exceeded, the variation of coma with zooming increases largely, so that the image aberrations over the entire area of the picture frame become difficult to maintain well.

Four numerical examples of zoom lenses of the invention are shown below. In the numerical examples 1 to 4, Ri denotes the radius of curvature of the i-th lens surface counting from front, Di denotes the i-th axial lens thickness or air separation counting from the front, and Ni and γi denote respectively the refractive index and Abbe number of the glass of the i-th lens element, counting from the front.

R23, R24, R25 and R26 are of infinite radius, representing an optical low-pass filter, an IR cut filter, or the like.

The values of the factors in the above-described conditions (1) to (7) for the numerical examples (1) to (4) are listed in Table-1.

Numerical Example 1 (FIGS. 1, 5(A), 5(B) and 5(C)

| | | F = 12.24–39.26 | | FNO = 1:2-2.5 | | 2ω = 48.4°–15.9° | | |
|---|---|---|---|---|---|---|---|---|
| R1 = | 131.80 | D1 = | 1.50 | N1 = | 1.80518 | ν1 = | 25.4 |
| R2 = | 51.60 | D2 = | 5.20 | N2 = | 1.51633 | ν2 = | 64.1 |
| R3 = | −78.48 | D3 = | 0.20 | | | | |
| R4 = | 30.53 | D4 = | 3.20 | N3 = | 1.60311 | ν3 = | 60.7 |
| R5 = | 71.80 | D5 = | Variable | | | | |
| R6 = | 52.08 | D6 = | 1.00 | N4 = | 1.80610 | ν4 = | 40.9 |
| R7 = | 16.45 | D7 = | 2.60 | | | | |
| R8 = | −23.16 | D8 = | 1.00 | N5 = | 1.77250 | ν5 = | 49.6 |
| R9 = | 16.00 | D9 = | 1.10 | | | | |
| R10 = | 19.49 | D10 = | 3.00 | N6 = | 1.84666 | ν6 = | 23.9 |
| R11 = | −601.48 | D11 = | Variable | | | | |
| R12 = | Stop | D12 = | Variable | | | | |
| R13 = | 33.16 | D13 = | 1.00 | N7 = | 1.68893 | ν7 = | 31.1 |
| R14 = | 16.65 | D14 = | 0.50 | | | | |
| R15 = | 33.36 | D15 = | 2.50 | N8 = | 1.63854 | ν8 = | 55.4 |
| R16 = | −33.66 | D16 = | 0.15 | | | | |
| R17 = | 12.01 | D17 = | 3.00 | N9 = | 1.77250 | ν9 = | 49.6 |
| R18 = | 44.74 | D18 = | 2.58 | | | | |
| R19 = | 163.70 | D19 = | 3.00 | N10 = | 1.80518 | ν10 = | 25.4 |
| R20 = | 10.56 | D20 = | 2.71 | | | | |
| R21 = | 31.03 | D21 = | 2.30 | N11 = | 1.69680 | ν11 = | 55.5 |
| R22 = | −20.83 | D22 = | Variable | | | | |
| R23 = | ∞ | D23 = | 7.30 | N12 = | 1.51633 | ν12 = | 64.1 |
| R24 = | ∞ | b.f. = | 7.61 | | | | |

| Variable | Focal Length | | |
|---|---|---|---|
| Separation | 12.24 | 20.79 | 39.26 |
| D5 | 2.01 | 10.11 | 18.21 |
| D11 | 17.66 | 9.56 | 1.46 |
| D12 | 6.73 | 4.31 | 1.51 |
| D22 | 5.00 | 7.43 | 10.22 | fI = 53.25
fII = −15
fIII = 18.8

Numerical Example 2 (FIGS. 2, 6(A), 6(B) and 6(C))

| | | F = 12.24–39.14 | | FNO = 1:2-2.5 | | 2ω = 48.4°–16° | | |
|---|---|---|---|---|---|---|---|---|
| R1 = | 153.15 | D1 = | 1.50 | N1 = | 1.80518 | ν1 = | 25.4 |
| R2 = | 48.96 | D2 = | 5.20 | N2 = | 1.51633 | ν2 = | 64.1 |
| R3 = | −72.84 | D3 = | 0.20 | | | | |
| R4 = | 27.62 | D4 = | 3.20 | N3 = | 1.60311 | ν3 = | 60.7 |
| R5 = | 61.26 | D5 = | Variable | | | | |
| R6 = | 38.11 | D6 = | 1.00 | N4 = | 1.77250 | ν4 = | 49.6 |
| R7 = | 15.75 | D7 = | 3.07 | | | | |
| R8 = | −23.98 | D8 = | 1.00 | N5 = | 1.77250 | ν5 = | 49.6 |
| R9 = | 15.55 | D9 = | 1.32 | | | | |
| R10 = | 19.28 | D10 = | 3.00 | N6 = | 1.84666 | ν6 = | 23.9 |
| R11 = | 269.74 | D11 = | Variable | | | | |
| R12 = | Stop | D12 = | Variable | | | | |
| R13 = | 35.12 | D13 = | 1.00 | N7 = | 1.71736 | ν7 = | 29.5 |
| R14 = | 17.30 | D14 = | 0.50 | | | | |
| R15 = | 34.46 | D15 = | 2.50 | N8 = | 1.69680 | ν8 = | 55.5 |
| R16 = | −33.93 | D16 = | 0.15 | | | | |

-continued

| | | | | | | | | |
|---|---|---|---|---|---|---|---|---|
| R17 | = | 12.08 | D17 | = | 3.00 | N9 | = | 1.77250 ν9 | = | 49.6 |
| R18 | = | 45.48 | D18 | = | 3.53 | | | |
| R19 | = | 240.65 | D19 | = | 2.00 | N10 | = | 1.80518 ν10 | = | 25.4 |
| R20 | = | 10.66 | D20 | = | 1.61 | | | |
| R21 | = | 35.05 | D21 | = | 2.30 | N11 | = | 1.69680 ν11 | = | 55.5 |
| R22 | = | −19.75 | D22 | = | Variable | | | |
| R23 | = | ∞ | D23 | = | 7.30 | N12 | = | 1.51633 ν12 | = | 64.1 |
| R24 | = | ∞ | b.f. | = | 6.51 | | | |

| Variable | Focal Length | | |
|---|---|---|---|
| Separation | 12.24 | 20.79 | 39.14 |
| D5 | 1.57 | 9.59 | 17.62 |
| D11 | 17.54 | 9.51 | 1.49 |
| D12 | 6.30 | 3.97 | 1.48 |
| D22 | 5.00 | 7.33 | 9.82 | fI = 52.75
fII = −15
fIII = 17.97

Numerical Example 3 (FIGS. 3, 7(A), 7(B) and 7(C)))

F = 12.24−39.14  FNO = 1:2−2.5  2ω = 48.4°−16°

| | | | | | | | | | | |
|---|---|---|---|---|---|---|---|---|---|---|
| R1 | = | 124.26 | D1 | = | 1.50 | N1 | = | 1.80518 ν1 | = | 25.4 |
| R2 | = | 49.96 | D2 | = | 5.20 | N2 | = | 1.51633 ν2 | = | 64.1 |
| R3 | = | −84.17 | D3 | = | 0.20 | | | | | |
| R4 | = | 28.66 | D4 | = | 3.20 | N3 | = | 1.60311 ν3 | = | 60.7 |
| R5 | = | 64.85 | D5 | = | Variable | | | | | |
| R6 | = | 35.98 | D6 | = | 1.00 | N4 | = | 1.80610 ν4 | = | 40.9 |
| R7 | = | 15.08 | D7 | = | 3.16 | | | | | |
| R8 | = | −23.81 | D8 | = | 1.00 | N5 | = | 1.77250 ν5 | = | 49.6 |
| R9 | = | 15.58 | D9 | = | 1.18 | | | | | |
| R10 | = | 18.94 | D10 | = | 3.00 | N6 | = | 1.84666 ν6 | = | 23.9 |
| R11 | = | 570.70 | D11 | = | Variable | | | | | |
| R12 | = | Stop | D12 | = | Variable | | | | | |
| R13 | = | 36.67 | D13 | = | 1.00 | N7 | = | 1.75520 ν7 | = | 27.5 |
| R14 | = | 19.37 | D14 | = | 0.50 | | | | | |
| R15 | = | 24.46 | D15 | = | 2.50 | N8 | = | 1.77250 ν8 | = | 49.6 |
| R16 | = | −59.11 | D16 | = | 0.15 | | | | | |
| R17 | = | 11.81 | D17 | = | 3.00 | N9 | = | 1.77250 ν9 | = | 49.6 |
| R18 | = | 59.51 | D18 | = | 2.34 | | | | | |
| R19 | = | −221.31 | D19 | = | 3.00 | N10 | = | 1.80518 ν10 | = | 25.4 |
| R20 | = | 9.45 | D20 | = | 2.23 | | | | | |
| R21 | = | −38.30 | D21 | = | 2.00 | N11 | = | 1.60311 ν11 | = | 60.7 |
| R22 | = | −18.24 | D22 | = | 0.15 | | | | | |
| R23 | = | 17.36 | D23 | = | 2.50 | N12 | = | 1.69700 ν12 | = | 48.5 |
| R24 | = | 54.87 | D24 | = | Variable | | | | | |
| R25 | = | ∞ | D25 | = | 7.30 | N13 | = | 1.51633 ν13 | = | 64.1 |
| R26 | = | ∞ | b.f. | = | 4.27 | | | | | |

| Variable | Focal Length | | |
|---|---|---|---|
| Separation | 12.24 | 20.90 | 39.14 |
| D5 | 1.38 | 9.41 | 17.43 |
| D11 | 17.54 | 9.52 | 1.49 |
| D12 | 6.30 | 3.96 | 1.47 |
| D24 | 5.00 | 7.33 | 9.82 | fI = 52.75
fII = −15
fIII = 17.97

F = 11.22−34.28  FNO = 1:2−2.4  2ω = 52.2°−18.2°

| | | | | | | | | | | |
|---|---|---|---|---|---|---|---|---|---|---|
| R1 | = | 98.08 | D1 | = | 1.50 | N1 | = | 1.80518 ν1 | = | 25.4 |
| R2 | = | 44.27 | D2 | = | 5.50 | N2 | = | 1.51633 ν2 | = | 64.1 |
| R3 | = | −87.55 | D3 | = | 0.20 | | | | | |
| R4 | = | 24.80 | D4 | = | 3.20 | N3 | = | 1.60311 ν3 | = | 60.7 |
| R5 | = | 48.36 | D5 | = | Variable | | | | | |
| R6 | = | 41.08 | D6 | = | 1.20 | N4 | = | 1.80400 ν4 | = | 46.6 |
| R7 | = | 13.79 | D7 | = | 2.88 | | | | | |
| R8 | = | −24.91 | D8 | = | 1.00 | N5 | = | 1.77250 ν5 | = | 49.6 |
| R9 | = | 15.44 | D9 | = | 1.65 | | | | | |
| R10 | = | 20.28 | D10 | = | 2.60 | N6 | = | 1.84666 ν6 | = | 23.9 |
| R11 | = | −1117.47 | D11 | = | Variable | | | | | |
| R12 | = | Stop | D12 | = | Variable | | | | | |
| R13 | = | 30.90 | D13 | = | 1.20 | N7 | = | 1.75520 ν7 | = | 27.5 |
| R14 | = | 16.34 | D14 | = | 0.81 | | | | | |

-continued

| R15 = | 34.86 | D15 = | 2.70 | N8 = | 1.77250 | ν8 = | 49.6 |
|---|---|---|---|---|---|---|---|
| R16 = | −38.14 | D16 = | 0.15 | | | | |
| R17 = | 12.03 | D17 = | 3.10 | N9 = | 1.69680 | ν9 = | 55.5 |
| R18 = | 36.34 | D18 = | 2.72 | | | | |
| R19 = | 47.72 | D19 = | 3.00 | N10 = | 1.84666 | ν10 = | 23.9 |
| R20 = | 10.71 | D20 = | 1.40 | | | | |
| R21 = | 30.17 | D21 = | 4.00 | N11 = | 1.69680 | ν11 = | 55.5 |
| R22 = | −20.37 | D22 = | Variable | | | | |
| R23 = | ∞ | D23 = | 7.30 | N12 = | 1.51633 | ν12 = | 64.1 |
| R24 = | ∞ | b.f. = | 5.84 | | | | |

| Variable Separation | Focal Length | | |
|---|---|---|---|
| | 11.22 | 18.79 | 34.28 |
| D5 | 1.40 | 8.98 | 16.56 |
| D11 | 16.91 | 9.33 | 1.75 |
| D12 | 5.63 | 3.59 | 1.58 |
| D22 | 5.00 | 7.04 | 9.04 | fI = 50
fII = −14
fIII = 17.63

TABLE 1

| | Numerical example | | | |
|---|---|---|---|---|
| Condition | 1 | 2 | 3 | 4 |
| (1) β2T | −0.965 | −0.987 | −0.987 | −0.976 |
| (2) β3T | −0.764 | −0.752 | −0.752 | −0.70 |
| (3) XIII/fW | 0.43 | 0.39 | 0.39 | 0.36 |
| (4) fW/f3a | −0.267 | −0.255 | −0.083 | −0.26 |
| (5) D3a/fW | 0.21 | 0.29 | 0.19 | 0.24 |
| (6) N312 | 1.63854 | 1.6968 | 1.7725 | 1.7725 |
| (7) f2a/fW | −0.031 | −0.035 | −0.014 | −0.054 |

In the foregoing embodiment, the diameter of the first lens group is minimized owing to the arrangement of the stop in between the second lens group and the third lens group and the minimization of the movement of the second lens group for zooming from the wide-angle end to the telephoto end. In the following embodiment, on the other hand, although the diameter of the first lens group is somewhat increased, shortening of the total length of the zoom lens has been achieved This embodiment is next described by reference to the drawings.

Figure 9:
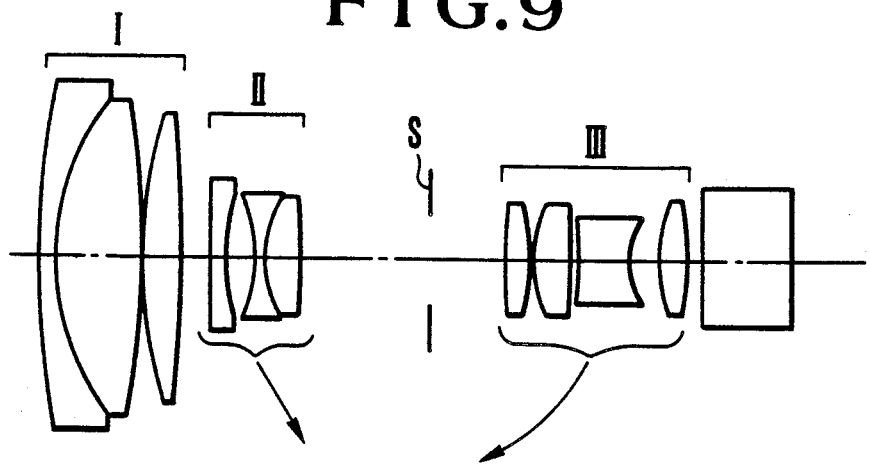
Figure 10:
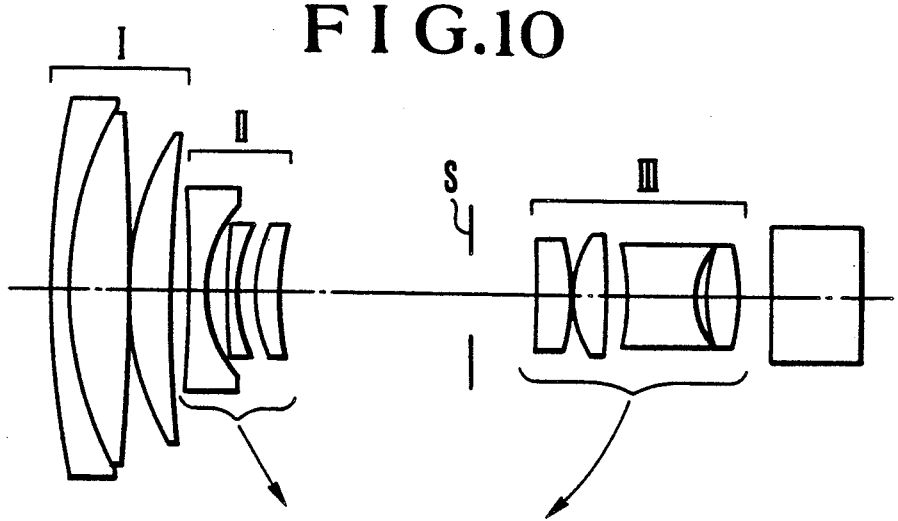
Figure 11:
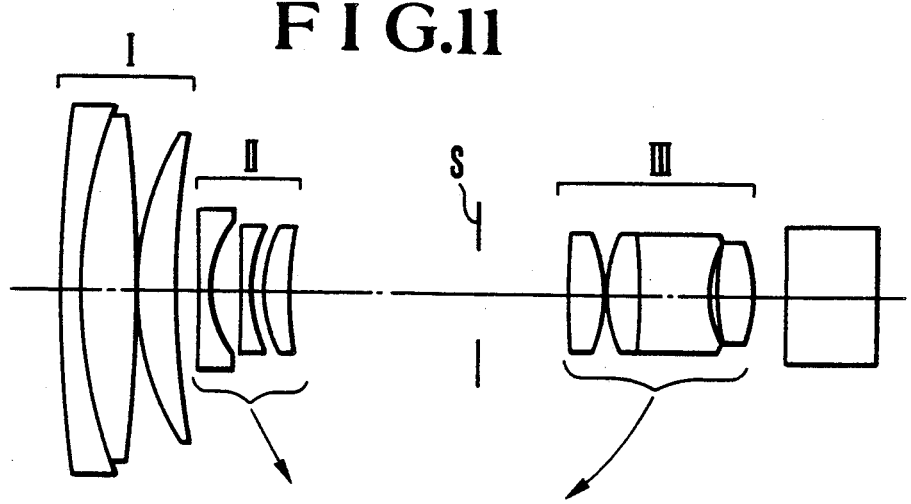
Figure 12A:
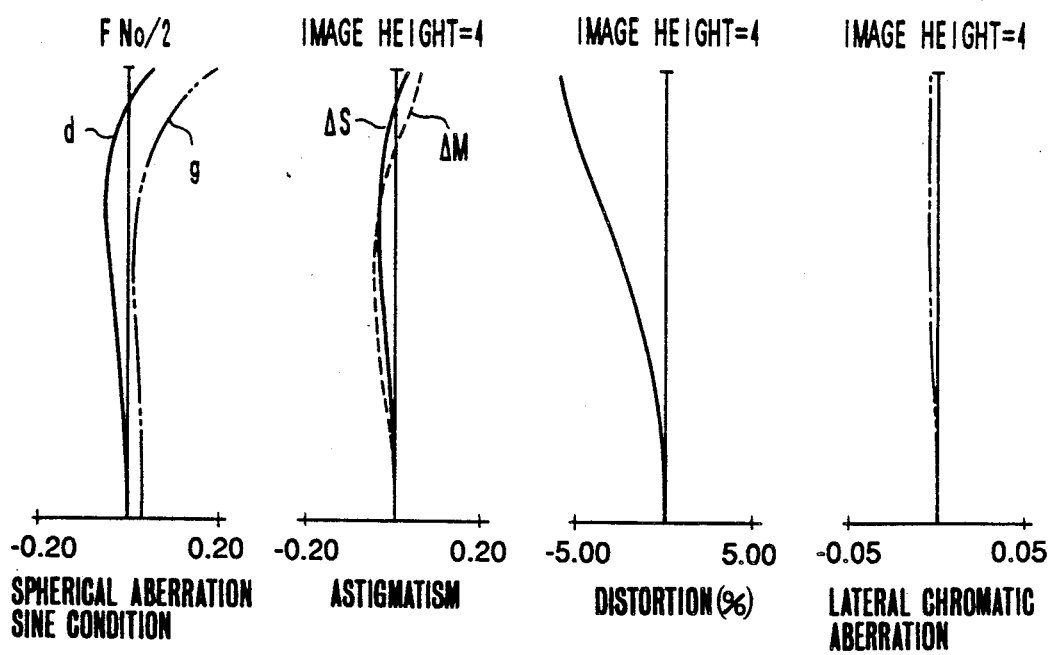
Figure 12B:
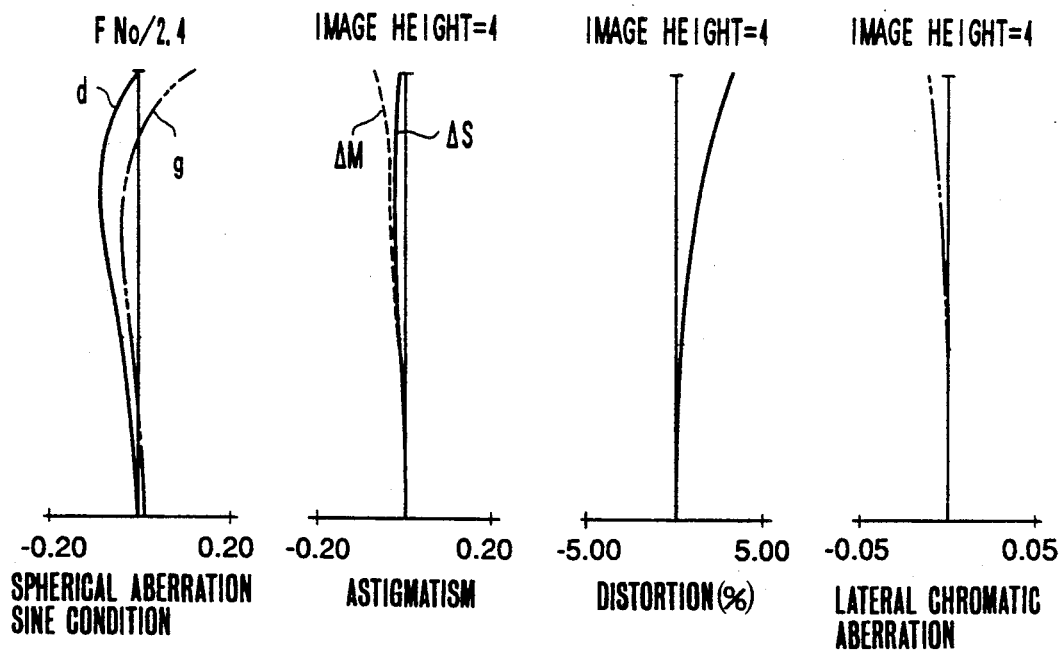
Figure 12C:
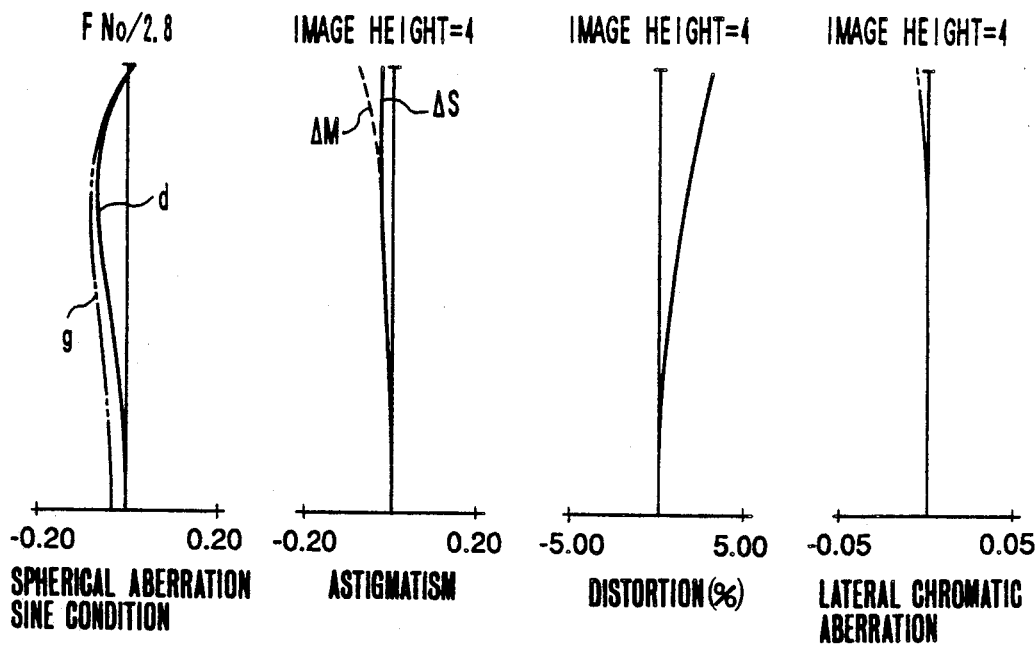
Figure 13A:
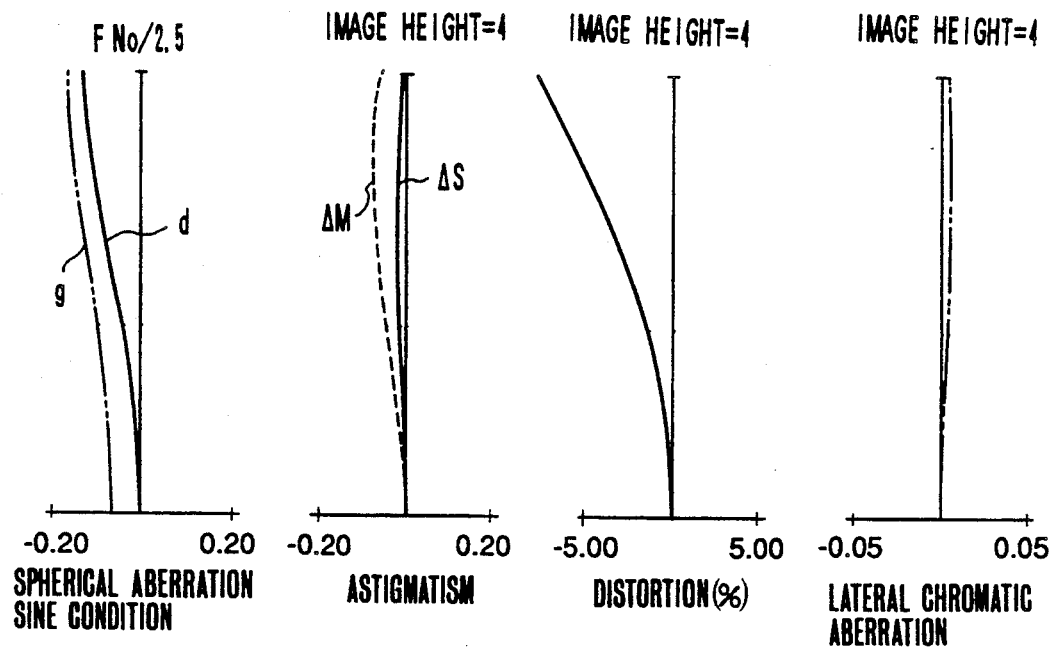
Figure 13B:
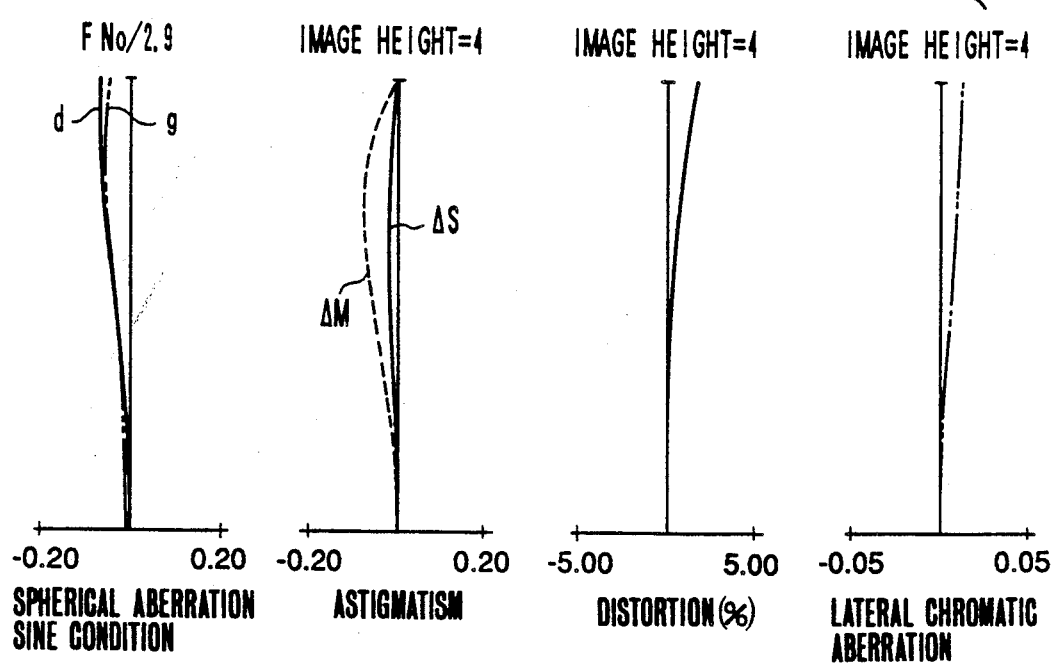
Figure 13C:
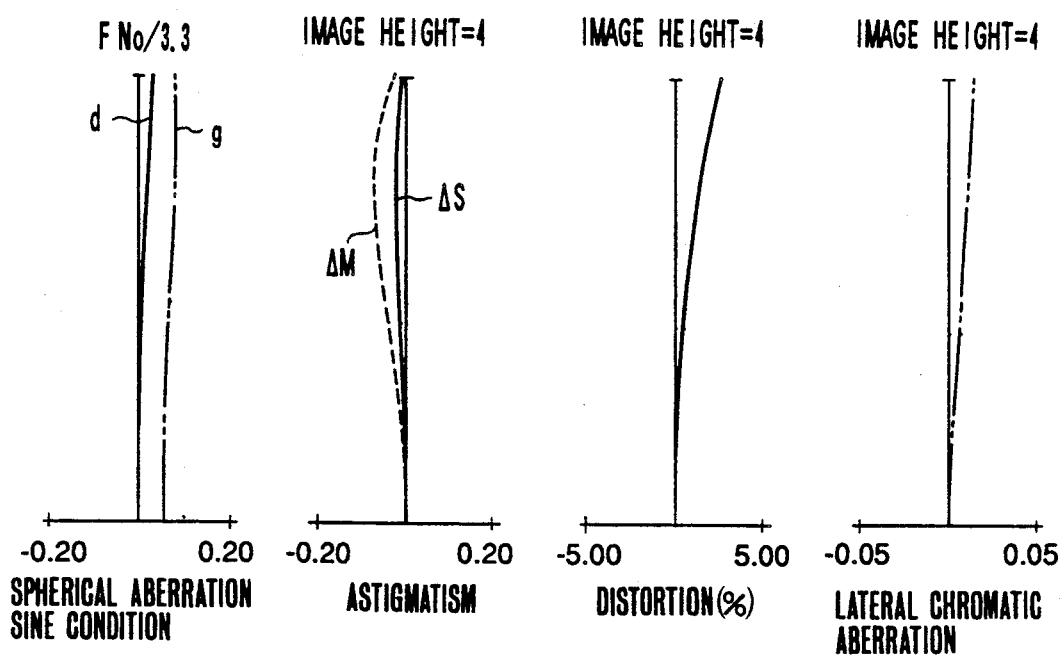
Figure 14A:
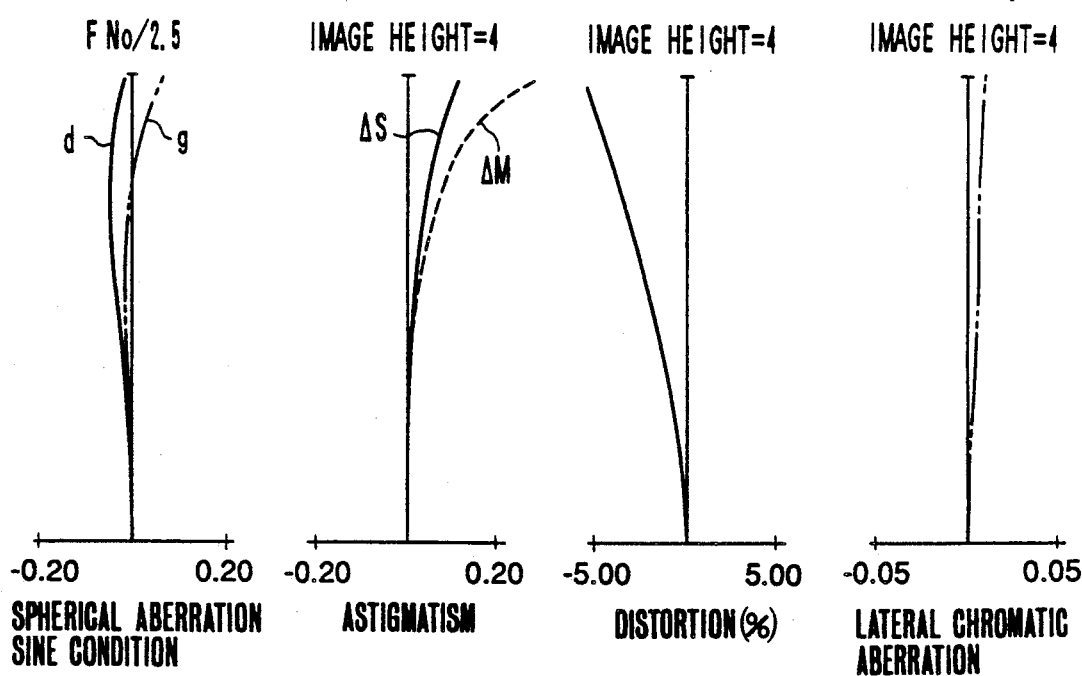
Figure 14B:
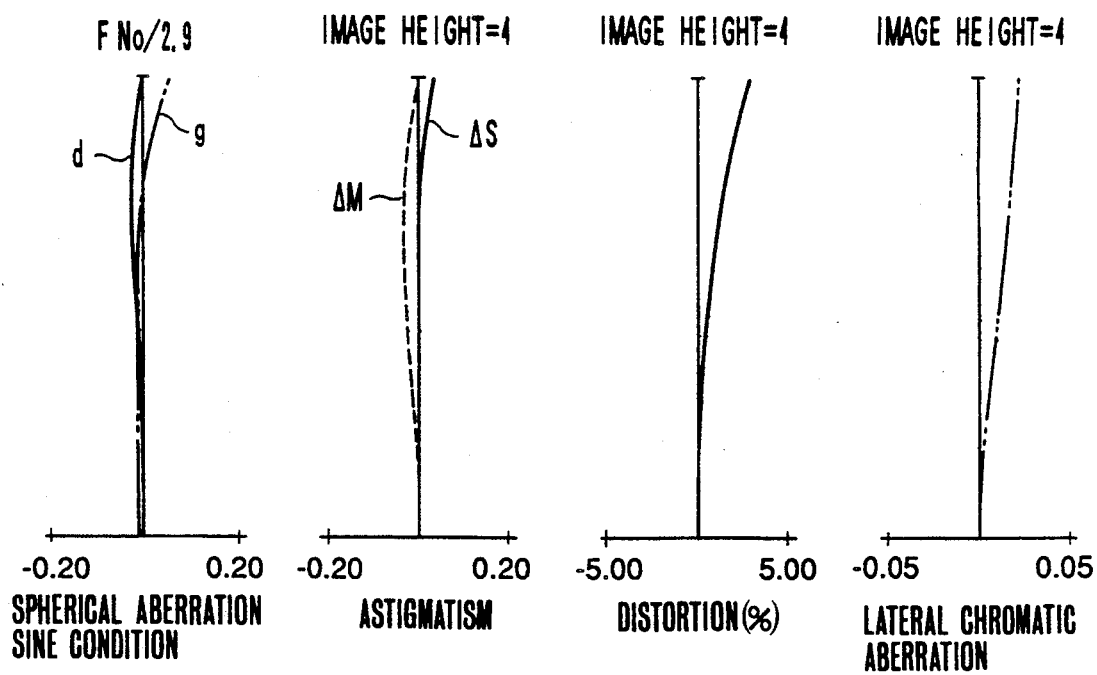
Figure 14C:
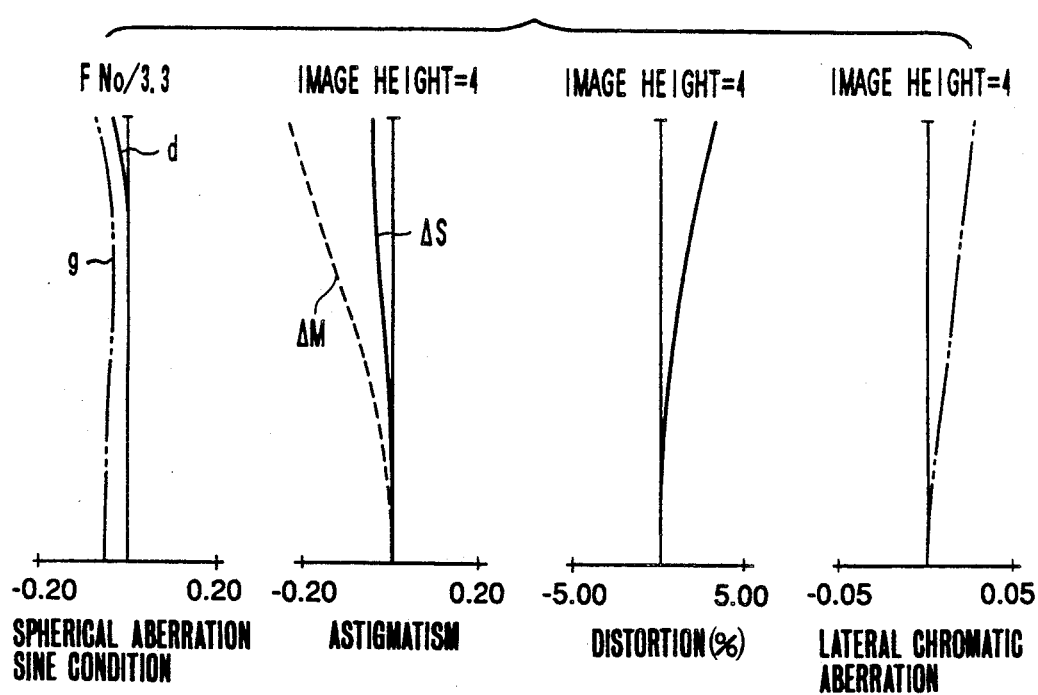

FIG. 9 shows a longitudinal section of a zoom lens with which the invention concerns. In FIG. 9, the zoom lens comprises a first lens group I having a positive refractive power, a second lens group II having a negative refractive power, a stop S and a third lens group III having a positive refractive power arranged on a common optical axis in this order from the front.

And, in the present embodiment, when zooming from the wide-angle end to the telephoto end, the second lens group of negative power and the third lens group of positive power are made to move in such a way as to depict their loci of motion in opposite directions to each other on the optical axis. This enables every one of the movable lens groups to take its share of the focal length varying function Thus, a high zoom ratio is obtained.

Another features of the invention are the following conditions:

$$0.7 < \beta_{2T}/\beta_{3T} < 1.25 \tag{8}$$

$$-1.4 < \beta_{2T} < -0.7 \tag{9}$$

where β2T and β3T are the image magnifications at the telephoto end of the second lens group and the third lens group, respectively.

When the above-described conditions are satisfied at once, a minimization of the size of the zoom lens is achieved while still permitting the aberrations which vary with zooming to be corrected in good balance by the second lens group and the third lens group.

The technical significances of the above-described conditions are explained below.

The inequalities of conditions (8) and (9) give proper ranges for the image magnifications β2T and β3T of the second lens group and the third lens group, respectively.

As will be seen from the condition (8), the image magnifications β2T and β3T of the second lens group and the third lens group are made almost equal to each other to thereby distribute the net amount of produced aberrations over all these lens groups. Thus, the amount of image aberrations varied by zooming is minimized. Here, when the lower limit of the condition (8) is exceeded, the spherical aberration tends to be over-corrected and, further at the telephoto end, field curvature tends to be over-corrected, both objectionably. When the upper limit of the condition (8) is exceeded, the range of variation of distortion with zooming increases and the range of variation of astigmatism, too, increases, both objectionably.

Also with the condition (9), when the upper limit is exceeded, over-correction of the spherical aberration results, and the field curvature tends to be under-corrected objectionably. Further, when the lower limit is exceeded, the entire lens system is increased in both longitudinal and lateral directions objectionably.

The foregoing rules of design for the image magnifications of the lens groups suffice for accomplishing the object of the invention. Yet, to attain further improved results, it is desirable to satisfy the following conditions.

That is, one of them is:

$$0.5 < fW/fII < 0.7 \tag{10}$$

where fW is the shortest focal length of the entire lens system and fIII is the focal length of the third lens group.

When the upper limit of the condition (10) is exceeded, the field curvature and the coma, in particular, increase extremely at the wide-angle end. When the lower limit is exceeded, the spherical aberration becomes difficult to correct.

Further, as the third lens group is constructed, comprising, from front to rear, a bi-convex first lens, a positive second lens of strong convex curvature toward the object side, a negative third lens of strong concave curvature toward the image side and a bi-convex fourth lens, the other conditions are:

$$0 < d_{III4}/fIII < 0.15 \quad (11)$$

$$1.6 < n_{II2} \quad (12)$$

where $d_{III4}$ is the axial air separation between the second lens and the third lens and $n_{II2}$ is the refractive index of the second lens.

The inequalities of condition (11) have an aim to correct the on-axial aberrations and the off-axial aberrations in good balance. When the upper limit is exceeded, the coma increases extremely. When the lower limit is exceeded, both of the spherical aberration and the field curvature become difficult to correct.

The inequality of condition (11) has an aim to correct the spherical aberration well. When the lower limit is exceeded, the zonal spherical aberration increases and the resolving power lowers.

It should be noted that the first lens group of the zoom lens concerning the present embodiment is made stationary during zooming for the purpose of minimizing the size of the lens system, but moves when focusing.

Also, if the second lens group is constructed with three lenses, i.e., a concave meniscus lens of strong concave curvature toward the image side, a concave lens and a convex lens of strong convex curvature toward the object side, the variation of aberrations, mainly the distortion and the coma, become easy to suppress.

Three numerical examples of zoom lenses of the invention are shown below. In the numerical examples 5 to 7, Ri is the radius of curvature of the i-th lens surface, counting from the front, Di is the i-th axial lens thickness or air separation, counting from the front, and Ni and vi are the refractive index and Abbe number of the glass of the i-th lens element, counting from the front.

R20, R21 and R22 are of infinite radius, representing an optical low-pass filter, an IR cut filter, or the like.

The values of the factors in the above-described conditions (8) to (12) for the numerical examples 5 to 7 are listed in Table-2.

Numerical Example 5 (FIGS. 9, 12(A), 12(B) and 12(C))

| | F = 8.24000-23.47 | | FNO = 1:2-2.8 | | 2ω = 51.8°-19.3° | | |
|---|---|---|---|---|---|---|---|
| R1 = | 92.584 | D1 = | 1.20 | N1 = | 1.83400 | v1 = | 37.2 |
| R2 = | 19.564 | D2 = | 6.00 | N2 = | 1.51633 | v2 = | 64.1 |
| R3 = | −71.690 | D3 = | 0.15 | | | | |
| R4 = | 38.124 | D4 = | 2.80 | N3 = | 1.77250 | v3 = | 49.6 |
| R5 = | −100.187 | D5 = | Variable | | | | |
| R6 = | 97.637 | D6 = | 1.00 | N4 = | 1.77250 | v4 = | 49.6 |
| R7 = | 14.118 | D7 = | 2.00 | | | | |
| R8 = | −11.793 | D8 = | 0.80 | N5 = | 1.83400 | v5 = | 37.2 |
| R9 = | 7.468 | D9 = | 2.50 | N6 = | 1.84666 | v6 = | 23.9 |
| R10 = | −57.161 | D10 = | Variable | | | | |
| R11 = | 0.000 (Stop) | D11 = | Variable | | | | |
| R12 = | 35.066 | D12 = | 2.00 | N7 = | 1.77250 | v7 = | 49.6 |
| R13 = | −25.503 | D13 = | 0.15 | | | | |
| R14 = | 7.235 | D14 = | 3.00 | N8 = | 1.60311 | v8 = | 60.7 |
| R15 = | −57.755 | D15 = | 0.50 | | | | |
| R16 = | −24.601 | D16 = | 3.50 | N9 = | 1.84666 | v9 = | 23.9 |
| R17 = | 5.936 | D17 = | 2.24 | | | | |
| R18 = | 13.783 | D18 = | 2.00 | N10 = | 1.83400 | v10 = | 37.2 |
| R19 = | −20.396 | D19 = | Variable | | | | |
| R20 = | 0.000 | D20 = | 6.45 | N11 = | 1.51633 | v11 = | 64.1 |
| R21 = | 0.000 | | | | | | |

| Variable Separation | Focal Length | | |
|---|---|---|---|
| | 8.24 | 15.13 | 23.47 |
| D5 | 2.27 | 7.84 | 10.62 |
| D10 | 9.35 | 3.78 | 0.99 |
| D11 | 5.44 | 3.28 | 1.01 |
| D19 | 1.03 | 3.19 | 5.46 | fI = 35
fII = −9.78
fIII = 11.96
b.f. = 3.46

Numerical Example 6 (FIGS. 10, 13(A), 13(B) and 13(C))

| | F = 7.64215-25.755 | | FNO = 1:2.5-3.3 | | 2ω = 55.3°-17.71° | | |
|---|---|---|---|---|---|---|---|
| R1 = | 89.644 | D1 = | 1.30 | N1 = | 1.80518 | v1 = | 25.4 |
| R2 = | 30.333 | D2 = | 4.00 | N2 = | 1.51633 | v2 = | 64.1 |
| R3 = | −261.567 | D3 = | 0.15 | | | | |
| R4 = | 21.809 | D4 = | 2.90 | N3 = | 1.69680 | v3 = | 55.5 |
| R5 = | 94.496 | D5 = | Variable | | | | |
| R6 = | −151.325 | D6 = | 1.00 | N4 = | 1.77250 | v4 = | 49.6 |
| R7 = | 8.570 | D7 = | 1.73 | | | | |
| R8 = | 38.912 | D8 = | 0.80 | N5 = | 1.77250 | v5 = | 49.6 |
| R9 = | 11.546 | D9 = | 1.27 | | | | |
| R10 = | 11.500 | D10 = | 1.80 | N6 = | 1.84666 | v6 = | 23.9 |

-continued

| | | | | | | | | |
|---|---|---|---|---|---|---|---|---|
| R11 | = | 25.824 | D11 | = | Variable | | | |
| R12 | = | 0.000 (Stop) | D12 | = | Variable | | | |
| R13 | = | −345.031 | D13 | = | 2.50 | N7 = 1.56732 | ν7 = | 42.8 |
| R14 | = | −15.534 | D14 | = | 0.15 | | | |
| R15 | = | 8.461 | D15 | = | 2.50 | N8 = 1.77250 | ν8 = | 49.6 |
| R16 | = | −74.804 | D16 | = | 1.50 | | | |
| R17 | = | −18.059 | D17 | = | 4.80 | N9 = 1.84666 | ν9 = | 23.9 |
| R18 | = | 6.373 | D18 | = | 0.78 | | | |
| R19 | = | 12.287 | D19 | = | 2.40 | N10 = 1.62299 | ν10 = | 58.1 |
| R20 | = | −14.989 | D20 | = | Variable | | | |
| R21 | = | 0.000 | D21 | = | 6.45 | N11 = 1.51633 | ν11 = | 64.1 |
| R22 | = | 0.000 | | | | | | |

| Variable | Focal Length | | |
|---|---|---|---|
| Separation | 7.64 | 16.61 | 25.76 |
| D5 | 1.41 | 9.31 | 12.70 |
| D11 | 13.55 | 5.65 | 2.26 |
| D12 | 5.36 | 2.90 | 1.20 |
| D20 | 2.40 | 4.86 | 6.56 | fI = 37.96
fII = −10.28
fIII = 12.1
b.f. = 1.15

Numerical Example 7 (FIGS. 11, 14(A), 14(B) and 14(C))

F = 7.54027−25.805  FNO = 1:2.5−3.3  2ω = 55.9°−17.6°

| | | | | | | | | |
|---|---|---|---|---|---|---|---|---|
| R1 | = | 113.798 | D1 | = | 1.30 | N1 = 1.80518 | ν1 = | 25.4 |
| R2 | = | 38.819 | D2 | = | 4.00 | N2 = 1.51633 | ν2 = | 64.1 |
| R3 | = | −109.888 | D3 | = | 0.15 | | | |
| R4 | = | 22.278 | D4 | = | 2.90 | N3 = 1.69680 | ν3 = | 55.5 |
| R5 | = | 92.355 | D5 | = | Variable | | | |
| R6 | = | −1280.024 | D6 | = | 1.00 | N4 = 1.77250 | ν4 = | 49.6 |
| R7 | = | 7.380 | D7 | = | 1.95 | | | |
| R8 | = | 150.139 | D8 | = | 0.80 | N5 = 1.77250 | ν5 = | 49.6 |
| R9 | = | 11.845 | D9 | = | 1.07 | | | |
| R10 | = | 11.195 | D10 | = | 1.80 | N6 = 1.84666 | ν6 = | 23.9 |
| R11 | = | 41.289 | D11 | = | Variable | | | |
| R12 | = | 0.000 (Stop) | D12 | = | Variable | | | |
| R13 | = | 37.119 | D13 | = | 2.50 | N7 = 1.56732 | ν7 = | 42.8 |
| R14 | = | −18.317 | D14 | = | 0.15 | | | |
| R15 | = | 9.227 | D15 | = | 2.50 | N8 = 1.77250 | ν8 = | 49.6 |
| R16 | = | −181.158 | D16 | = | 0.22 | | | |
| R17 | = | −38.723 | D17 | = | 4.80 | N9 = 1.84666 | ν9 = | 23.9 |
| R18 | = | 6.770 | D18 | = | 0.81 | | | |
| R19 | = | 21.487 | D19 | = | 2.40 | N10 = 1.62299 | ν10 = | 58.1 |
| R20 | = | −16.865 | D20 | = | Variable | | | |
| R21 | = | 0.000 | D21 | = | 6.45 | N11 = 1.51633 | ν11 = | 64.1 |
| R22 | = | 0.000 | | | | | | |

| Variable | Focal Length | | |
|---|---|---|---|
| Separation | 7.54 | 16.94 | 25.81 |
| D5 | 1.25 | 9.15 | 12.54 |
| D11 | 13.60 | 5.70 | 2.31 |
| D12 | 6.67 | 4.10 | 2.83 |
| D20 | 2.40 | 4.97 | 6.24 | fI = 35.18
fII = −9.76
fIII = 12.64
b.f. = 3.45

TABLE 2

| Numerical Example | 5 | 6 | 7 |
|---|---|---|---|
| β2T | −0.76 | −0.84 | −0.94 |
| β3T | −0.88 | −0.81 | −0.78 |
| fW | 8.24 | 7.64 | 7.54 |
| fIII | 11.96 | 12.1 | 12.64 |
| dIII4 | 0.5 | 1.5 | 0.22 |
| nIII2 | 1.60311 | 1.7725 | 1.7725 |
| β2T/β3T | 0.86 | 1.04 | 1.21 |
| fW/fIII | 0.69 | 0.63 | 0.6 |

TABLE 2-continued

| Example | 5 | 6 | 7 |
|---|---|---|---|
| dIII4/fIII | 0.04 | 0.12 | 0.02 |

As has been described above, in the zoom lens of the 3-lens group form having positive, negative and positive refractive powers in this order from the front, by making appropriate the refractive power arrangement and lens forms of the second lens group and the third lens group having the focal length varying function, it becomes possible to make up the zoom lens whose zoom ratio is 3 to 3.5 with a high performance and in compact form.

What is claimed is:

1. A zoom lens comprising, from front to rear, a first lens group of positive refractive power, a second lens group of negative refractive power, and a third lens group of positive refractive power, wherein zooming is performed by moving said second lens group and said third lens group, and the following conditions are satisfied:

$$0.9 < |\beta 2T| < 1.1, \beta 2T < 0$$

$$0.5 < |\beta 3T| < 1, \beta 3T < 0$$

$$0.4 < XIII/fW < 0.6$$

where $\beta 2T$ and $\beta 3T$ are the image magnifications of said second lens group and said third lens group respectively, XIII is the amount of movement of said third lens group as zooming is performed, and fW is the shortest focal length of the entire lens system.

2. A zoom lens according to claim 1, further comprising a fixed stop arranged in between said second lens group and said third lens group.

3. A zoom lens according to claim 1 or 2, wherein zooming from the wide-angle end to the telephoto end is performed by moving said second lens group to the image side and said third lens group to the object side, and focusing is performed by moving said first lens group.

4. A zoom lens according to claim 1 or 2, wherein said third lens group has a front lens sub-group and a rear lens sub-group with the widest air separation in said third lens group taking its place at the boundary therebetween, said front lens sub-group comprising, from front to rear, a meniscus-shaped negative first lens concave toward the image side, a positive second lens whose both surfaces are convex, and a meniscus-shaped positive third lens convex toward the object side, and said rear lens sub-group comprising a negative lens having a concave surface facing the image side and at least one positive lens, satisfying the following conditions:

| 0.05 | < | \|fW/f3a\| | < | 0.35 |
|---|---|---|---|---|
|  |  | f3a | < | 0 |
| 0.15 | < | D3a/fW | < | 0.4 |
| 1.6 | < | N312 |  |  | where f3a is the focal length of an air lens formed by said negative first lens and said positive second lens, D3a is an axial air separation between said front lens sub-group and said rear lens sub-group, and N312 is the refractive index of the material of said positive second lens.

5. A zoom lens comprising, from front to rear, a first lens group having a positive refractive power, a second lens group having a negative refractive power, and a third lens group having a positive refractive power, wherein zooming from the wide-angle end to the telephoto end is performed by moving said second lens group from the object side to the image side while simultaneously moving said third lens group from the image side to the object side, and the following conditions are satisfied:

$$0.7 < \beta 2T/\beta 3T < 1.25$$

$$-1.4 < \beta 2T < -0.7$$

where $\beta 2T$ is the image magnification at the telephoto end of said second lens group, and $\beta 3T$ is the image magnification at the telephoto end of said third lens group.

6. A zoom lens according to claim 5, satisfying the following condition:

$$0.5 < fW/fIII < 0.7$$

where fIII and fW are the focal length of said third lens group and the shortest focal length of the entire lens system respectively.

7. A zoom lens according to claim 6, wherein said third lens group includes, from front to rear, a bi-convex first lens, a second lens having a positive refractive power with its front surface of strong convex curvature toward the object side, a third lens group having a negative refractive power with its rear lens surface of strong concave curvature toward the image side, and a bi-convex fourth lens, and satisfies the following conditions:

$$0 < d_{III4}/fIII < 0.15$$

$$1.6 < n_{III2}$$

where $d_{III4}$ is an axial air separation between said second lens and said third lens in said third lens group, and $n_{III2}$ is the refractive index of said second lens in said third lens group.

* * * * *

UNITED STATES PATENT AND TRADEMARK OFFICE
CERTIFICATE OF CORRECTION

PATENT NO. : 4,991,942
DATED : February 12, 1991
INVENTOR(S) : KAZUO FUJIBAYASHI, ET AL.

It is certified that error appears in the above-identified patent and that said Letters Patent is hereby corrected as shown below:

Column 6

Line 8, "$\gamma i$" should read --$\upsilon i$--.

Line 18, "5(C)" should read --5(C))--.

Line NE 1, "$\upsilon 10 \quad 25.4$" should read --$\upsilon 10 = 25.4$--.

Column 7

Line NE 3, "7(C)))" should read --7(C))--.

Line 55, Insert: --Numerical Example 4 (Figs. 4, 8(A), 8(B) and 8(C)):--.

UNITED STATES PATENT AND TRADEMARK OFFICE
CERTIFICATE OF CORRECTION

PATENT NO. : 4,991,942
DATED : February 12, 1991
INVENTOR(S) : KAZUO FUJIBAYASHI, ET AL.

It is certified that error appears in the above-identified patent and that said Letters Patent is hereby corrected as shown below:

Column 9

Line 39, "achieved" should read --achieved.--
    Line 56, "function" should read --function.--
    Line 57, "Another" should read --Other--.

Column 16

Line 32, "system" should read --system,--.

Signed and Sealed this

Eighth Day of September, 1992

Attest:

DOUGLAS B. COMER

*Attesting Officer*     *Acting Commissioner of Patents and Trademarks*